United States Patent [19]

Braun

[11] Patent Number: 4,747,877
[45] Date of Patent: May 31, 1988

[54] CHLORIDE-FREE HARDENING ACCELERANT FOR PORTLAND CEMENT AND PROCESS THEREOF

[75] Inventor: Hans-Ruediger Braun, Palling, Fed. Rep. of Germany

[73] Assignee: SKW Trostberg AG, Trostberg, Fed. Rep. of Germany

[21] Appl. No.: 940,425

[22] Filed: Dec. 11, 1986

[30] Foreign Application Priority Data

Dec. 12, 1985 [DE] Fed. Rep. of Germany ....... 3543874

[51] Int. Cl.$^4$ .............................................. C04B 24/12
[52] U.S. Cl. ...................... 106/90; 106/314; 106/315
[58] Field of Search ........................... 106/90, 314, 315

[56] References Cited

U.S. PATENT DOCUMENTS

| | | | |
|---|---|---|---|
| 1,972,207 | 9/1934 | Tucker | 106/90 |
| 2,141,569 | 12/1938 | Tucker et al. | 106/90 |
| 2,390,138 | 12/1945 | Vallandigham | 106/315 |
| 2,478,831 | 8/1949 | MacPerson | 106/90 |
| 3,359,225 | 12/1967 | Weisand | 106/89 |
| 3,537,869 | 11/1970 | Proell | 106/95 |
| 4,337,094 | 6/1982 | Tokar | 106/90 |

FOREIGN PATENT DOCUMENTS

| | | | |
|---|---|---|---|
| 1282533 | 11/1968 | Fed. Rep. of Germany | 106/314 |
| 2703182 | 7/1978 | Fed. Rep. of Germany | |
| 1184834 | 10/1985 | U.S.S.R. | 106/314 |

OTHER PUBLICATIONS

Betonwerk & Fertigteil-Technik, Heft; Aug. 1972, pp. 571, 577.

Primary Examiner—Steven Capella
Attorney, Agent, or Firm—Kenneth P. Glynn

[57] ABSTRACT

This invention relates to a chloride-free hardening accelerant for Portland cement which is active in particular at low temperatures and contains calcium nitrate, sodium nitrate, hexamethylenetetramine and sodium hydroxide. The accelerant is prepared by reacting the calculated amount of formaldehyde with calcium ammonium nitrate in aqueous solution at between room temperature and 55° C. under alkaline conditions established with sodium hydroxide. After the reaction had ended this solution can be used directly as such or be converted into a powder by means of a suitable drying operation.

16 Claims, No Drawings

CHLORIDE-FREE HARDENING ACCELERANT FOR PORTLAND CEMENT AND PROCESS THEREOF

BACKGROUND OF THE INVENTION

1. Field of the Invention

The invention relates to a hardening accelerant for Portland cement which, in particular, is active even at low temperatures.

2. Prior Art Statement

Calcium chloride is the most effective and longest known settling accelerant which acts even at low temperatures. However, its presence must be limited to 1 to at most 2% by weight of the cement content, since otherwise corrosion of the reinforcing rods is likely and construction damage results.

U.S. Pat. No. 2,390,138 proposes sodium nitrate for use as a settling accelerant. Commercially available additives contain calcium nitrate, frequently combined with triethanolamine (*Betonwerk+Fertigteiltechnik*, issue 8/1971, page 577).

German Offenlegungschrift No. 2,703,182 recommends the combination of an alkali metal nitrate with a water-soluble compound in the form of a condensation product of sulfonated aromatic hydrocarbon and aliphatic aldehyde and/or alkali metal salt of the condensation product, the alkali metal nitrate content being higher than the condensation product content.

U.S. Pat. No. 4,337,094, finally, proposes a hardening accelerant which essentially comprises calcium nitrate, a polyalkanolamine, for example triethanolamine, and if desired an alkali metal salt or an alkaline earth metal salt of an aliphatic polyhydroxy compound, for example sodium glucoheptonate, and the sodium salt of ligninsulfonic acid.

Further solidification accelerants are based on condensation products of naphthalenesulfonic acid and formaldehyde (U.S. Pat. Nos. 1,972,207; 2,141,569 and 2,478,831) to which still other additives are added (U.S. Pat. Nos. 3,359,225, 3,537,869).

The use of ammonium salts, for example ammonium nitrate, as hardening accelerants is subject to reservations, since ammonia evolves at the high basicities of cement slurries.

All the agents hitherto proposed either have harmful side effects, in particular on the reinforcing steels, or, in particular at low temperatures, must be used in excessively high concentrations for full activity. It is therefore an object to provide a hardening accelerant for Portland cement mortar which does not have the disadvantages described.

SUMMARY OF THE INVENTION

This object is achieved with a hardening accelerant for Portland cement and Portland cement mortar which acts even at low temperatures, which is based on nitrates and an amine and which contains calcium nitrate, sodium nitrate, hexamethylenetetramine and sodium hydroxide.

DETAILED DESCRIPTION OF THE PRESENT INVENTION

A preferred composition of the solidification accelerant contains:
- 30 to 60% by weight of calcium nitrate
- 0.5 to 15% by weight of sodium nitrate
- 0.05 to 10% by weight of hexamethylenetetramine
- 0.5 to 5% by weight of sodium hydroxide
- 68 to 10% by weight of water A particularly preferred composition of the solidification accelerant contains:
- 35 to 50% by weight of calcium nitrate
- 0.5 to 10% by weight of sodium nitrate
- 0.1 to 5% by weight of hexamethylenetetramine
- 0.5 to 3% by weight of sodium hydroxide
- 32 to 64% by weight of water This hardening accelerant is prepared by adding to commercially available calcium ammonium nitrate, which is also used as a fertilizer, sufficient formaldehyde to bind the ammonium, adding sodium hydroxide solution to obtain an alkaline pH and allowing the reaction to proceed at room temperature to 55° C. for one hour. Preferably a reaction temperature between 30° and 50° C. is chosen.

The calcium ammonium nitrate used can be any commercially available product; preference, however, is given to a product of the composition $5Ca(NO_3)_2 \times NH_4NO_3 \times 10H_2O$ which is regarded as a waste product and for which there are no particular uses.

The formaldehyde used is an aqueous formalin solution of 20 to 40% by weight of formaldehyde. Preference is given to using formalin containing 37% by weight of formaldehyde, in order to obtain the highest possible solids concentrations in the solution of the hardening accelerant. Should it prove expedient, it is also possible to use all or some of the formaldehyde in the form of paraformaldehyde.

The end product obtained in this way is a colorless or slightly yellow solution and has a pH value between 8 and 12. The hexamethylenetetramine content in the solution varies between 0.05 and 10% by weight. It is preferably adjusted to a content of 0.1 to 5% by weight, when optimal activity is obtained. The accelerant is ready to use in this form as a solution containing 35 to 55% by weight of solids. However, the product can also be converted into a solid product by known processes, for example by spray-drying. This does not have an adverse effect on the properties of the product.

It was a surprising observation that the hexamethylenetetramine formed in the reaction with formaldehyde has, in combination with the calcium nitrate, such a high activity in the hardening acceleration of different concretes, in particular at low temperatures.

Compared with the customarily used triethanolamine, hexamethylenetetramine in aqueous solution at temperatures between 5° and 15° C. has only weakly basic reaction (an aqueous solution which contains 5% by weight of hexamethylenetetramine as a pH value of 8.6), and in this respect is not comparable to conventional amines used as components of solidification accelerants. It is therefore surprising that in all experiments the onset of solidification is accelerated even more strongly by the product according to the invention, which essentially comprises a combination of calcium nitrate, sodium nitrate and hexamethylenetetramine, than by calcium chloride which is already highly active in this direction.

It is true that in regard of the compressive strength the one-day strength obtainable with calcium chloride is not achieved, but in terms of the 28-day strength the accelerant according to the invention is likewise superior to calcium chloride.

The air pore content is not affected by using the accelerant according to the invention.

The hardening accelerant according to the invention does not have any corrosive action on construction steel.

The non-limiting examples below further illustrate the invention in more detail.

EXAMPLES

(A) A PREPARATION EXAMPLE

A reaction vessel is charged first with 1,533 L of water at 40° to 50° C., and 2,154 kg of calcium ammonium nitrate of the formula $5Ca(NO_3)_2 \times NH_4NO_3 \times 10H_2O$ are dissolved therein. 215.4 kg of 37% by weight formalin solution are then added with thorough stirring while the reaction vessel is thoroughly vented by aspirating the escaping vapors (the amount of formaldehyde was calculated on the amount of ammonium salt present and determined in the reaction mixture, so that the amount of formaldehyde is sufficient to form the hexamethylenetetramine). Finally, 180.5 kg of sodium hydroxide are added in the form of a 50% strength by weight solution with thorough stirring the reaction mixture at a temperature between 30° and 50° C. The reaction mixture (4071 kg) is stirred without further heat supply for at least one hour and is then allowed to cool down to room temperature; it is colorless or slightly yellow and has a specific weight of 1,430±0.02 g/ml at 23° C. Its pH value is between 9 and 11. Its chemical composition is:

42.25% by weight of calcium nitrate
3.37% by weight of sodium nitrate
1.4% by weight of hexamethylenetetramine
1.3% by weight of sodium hydroxide
57.2% by weight of water This solution may be diluted with water to the desired concentration of 40% by weight. The hexamethylenetetramine content then varies within the range from 0.05 to 5% by weight.

(B) APPLICATION EXAMPLES

The examples below demonstrate the properties of concrete mixtures made up in accordance with ASTM C 192. The cement content 307 kg per cubic meter. The water content varies in order to obtain a uniform slump within the fluctuation range of ±1.27 cm. The air pore content was kept within the range of 5.8±1%. The calcium nitrate solution used as a comparison had a content of 40% by weight, and the calcium chloride solution was 32% by weight. The coarse aggregate comprised comminuted dolomite, and the fine aggregate was natural sand. Both aggregates conform to ASTM C 150. The cement mixing ratio was chosen in accordance with ACI 211.

The experiments represented in tables 1, 2 and 3 were carried out with different cements which are customary in the USA and conform to the standards.

TABLE 1

| Additive | ml of accelerant per 50 kg of cement | Water/cement ratio | Slump (cm) | Air pores content (%) | Onset of solidification at 5° C. | Compressive strength N/mm² 3 days | 7 days | 28 days |
|---|---|---|---|---|---|---|---|---|
| Comparison mixture | — | 0.53 | 12.0 | 4.8 | 9 h 51 min | 22.3 | 30.7 | 39.1 |
| Calcium-nitrate (pure) 40% strength solution | 650 ml | 0.52 | 12.0 | 5.4 | 8 h 18 min | 22.9 | 35.5 | 41.3 |
| Calcium nitrate (40% strength solution) with 2.5% TEA | 650 ml | 0.526 | 11.4 | 5.8 | 7 h 22 min | 21.0 | 32.8 | 38.6 |
| Additive A with 1.4% HMT | 650 ml | 0.509 | 10.8 | 5.8 | 8 h | 24.7 | 36.9 | 41.6 |

The accelerant used was the product prepared in accordance with example A (Additive A) with a content of 1.4% by weight of hexamethylenetetramine (HMT) in 40% strength by weight solution. The cement used was ASTM Type II.
TEA = Triethanolamine

TABLE 2

| | ml of accelerant per 50 kg of cement | Water/cement ratio | Slump (cm) | Air pores content (%) | Onset of solidification at 10° C. | Compressive strength N/mm² 1 d 10° C. | 3 d 10° C. | 7 d 23° C. | 28 d 23° C. |
|---|---|---|---|---|---|---|---|---|---|
| Control experiment | — | 0.538 | 13.3 | 5.2 | 8 h 48 min | 9.0 | 13.0 | 26.6 | 33.6 |
| Additive A with 1.5% HMT | 650 | 0.524 | 11.4 | 5.2 | 7 h 23 min | 9.1 | 13.1 | 31.9 | 37.6 |
| | 1300 | 0.511 | 14.0 | 6.0 | 6 h 48 min | 6.9 | 15.4 | 32.6 | 37.9 |
| Ca(NO₃)₂ with 2.5% TEA | 650 | 0.555 | 14.0 | 4.8 | 7 h 50 min | 9.3 | 13.7 | 29.6 | 35.8 |
| Ca(NO₃)₂ (40% strength solution) | 650 | 0.540 | 12.1 | 5.0 | 8 h 15 min | 7.9 | 13.0 | 29.2 | 37.0 |
| CaCl₂ (32% strength | 650 | 0.559 | 12.7 | 5.2 | 7 h 39 min | 12.6 | 13.9 | 26.8 | 33.4 |
| | 1790 | 0.530 | 12.7 | 5.5 | 6 h 20 min | 13.8 | 17.3 | 31.8 | 36.9 |

TABLE 2-continued

| ml of accelerant per 50 kg of cement | Water/ cement ratio | Slump (cm) | Air pores content (%) | Onset of solid- ification at 10° C. | Compressive strength N/mm² | | | |
|---|---|---|---|---|---|---|---|---|
| | | | | | 1 d 10° C. | 3 d 10° C. | 7 d 23° C. | 28 d 23° C. |
| solution) | | | | | | | | |

The accelerant used was the product prepared in accordance with example A (Additive A) with a content of 1.5% by weight of hexamethylenetetramine (HMT) in 40% strength by weight solution. The cement used was Huron ASTM Type I.

TABLE 3

| | ml of accelerant per 50 kg of cement | Water/ cement ratio | Slump (cm) | Air pores content (%) | Onset of solid- ification at 10° C. | Compressive strength N/mm² | | | |
|---|---|---|---|---|---|---|---|---|---|
| | | | | | | 1 day | 2 days | 7 days | 28 days |
| Control experiment | — | 0.538 | 16.5 | 6.8 | 7 h 50 min | 5.1 10° C. | 17.8 23° C. | 26.9 23° C. | 33.3 23° C. |
| Additive A with 1.5% HMT | 650 | 0.516 | 15.8 | 6.8 | 6 h 07 min | 7.2 | 18.6 | 29.2 | 35.6 |
| Ca(NO₃)₂ (40% strength solution) | 650 | 0.525 | 16.5 | 6.7 | 6 h 50 min | 4.8 | 17.7 | 28.3 | 35.2 |
| CaCl₂ (32% strength solution) | 650 | 0.532 | 16.5 | 6.8 | 7 h 14 min | 7.4 | 18.8 | 29.1 | 35.2 |

The accelerant used was the product prepared in accordance with example A (Additive A) with a content of 1.5% by weight of hexamethylenetetramine (HMT) in 40% strength by weight solution. The cement used was Lonestar ASTM Type I.

What is claimed is:

1. A chloride-free hardening accelerant for Portland cement and Portland cement mortar, based on nitrates and an amine and containing calcium nitrate, sodium nitrate, hexamethylenetetramine and sodium hydroxide.

2. A hardening accelerant as claimed in claim 1, having the following composition:
   30 to 60% by weight of calcium nitrate
   0.5 to 15% by weight of sodium nitrate
   0.05 to 10% by weight of hexamethylenetetramine
   0.5 to 5% by weight of sodium hydroxide
   68 to 10% by weight of water.

3. A hardening accelerant as claimed in claim 1, having the following composition:
   35 to 50% by weight of calcium nitrate
   0.5 to 10% by weight of sodium nitrate
   0.1 to 5% by weight of hexamethylenetetramine
   0.5 to 3% by weight of sodium hydroxide
   32 to 64% by weight of water.

4. A process for preparing a hardening accelerant as claimed in claim 1, 2 or 3, which comprises adding at room temperature to 55° C. to commercially available calcium ammonium nitrate an amount of formaldehyde which corresponds to that needed for binding the ammonium ion adding sufficient sodium hydroxide solution so as to obtain a pH value of 8 to 12, and stirring the reaction mixture for 1 hour without further heat supply.

5. A process for preparing a hardening accelerant as claimed in claim 4 wherein the calcium ammonium nitrate used is a product of the formula $5Ca(NO_3)_2 \times NH_4NO_3 \times 10H_2O$.

6. A process for preparing a hardening accelerant as claimed in claim 4, wherein the formaldehyde component used is an aqueous formalin solution containing from 20 to 40% by weight of formaldehyde.

7. A process for preparing a hardening accelerant as claimed in claim 5, wherein the formaldehyde component used is an aqueous formalin solution containing from 20 to 40% by weight for formalaehyde.

8. A process for preparing a hardening accelerant as claimed in claim 4, wherein the aqueous solution thereof is brought after the reaction was taken place to a concentration of 35 to 55% per weight of solid.

9. A process for preparing a hardening accelerant as claimed in claim 5, wherein the aqueous solution thereof is brought after the reaction has taken place to a concentration of 35 to 55% per weight of solid.

10. A process for preparing a hardening accelerant as claimed in claim 6, wherein the aqueous solution thereof is brought after the reaction has taken place to a concentration of 35 to 55% per weight of solid.

11. A process for preparing a hardening accelerant as claimed in claim 7, wherein the aqueous solution thereof is brought after the reaction has taken place to a concentration of 35 to 55% per weight of solid.

12. A process for preparing a hardening accelerant as claimed in claim 4, wherein the aqueous solution is converted into a solid product.

13. A process for preparing a hardening accelerant as claimed in claim 5, wherein the aqueous solution is converted into a solid product.

14. A process for preparing a hardening accelerant as claimed in claim 6, wherein the aqueous solution is converted into a solid product.

15. A process for preparing a hardening accelerant as claimed in claim 7, wherein the aqueous solution is converted into a solid product.

16. A process for preparing a hardening accelerant as claimed in claim 8, wherein the aqueous solution is converted into a solid product.

* * * * *